US009269299B2

(12) United States Patent
Tan et al.

(10) Patent No.: US 9,269,299 B2
(45) Date of Patent: Feb. 23, 2016

(54) PIXEL CIRCUIT, METHOD FOR DRIVING PIXEL CIRCUIT, AND DISPLAY PANEL (71) Applicants: CHENGDU BOE OPTOELECTRONICS TECHNOLOGY CO., LTD., Chengdu (CN); BOE TECHNOLOGY GROUP CO., LTD., Beijing (CN)

(72) Inventors: Wen Tan, Beijing (CN); Xiaojing Qi, Beijing (CN)

(73) Assignees: CHENGDU BOE OPTOELECTRONICS TECHNOLOGY CO., LTD., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 150 days.

(21) Appl. No.: 14/236,311

(22) PCT Filed: Aug. 5, 2013

(86) PCT No.: PCT/CN2013/080788
§ 371 (c)(1),
(2) Date: Jan. 30, 2014

(87) PCT Pub. No.: WO2014/205888
PCT Pub. Date: Dec. 31, 2014

(65) Prior Publication Data
US 2015/0269886 A1 Sep. 24, 2015

(30) Foreign Application Priority Data

Jun. 25, 2013 (CN) .......................... 2013 1 0256502

(51) Int. Cl.
G09G 3/32 (2006.01)
H04N 5/369 (2011.01)
H04N 5/3745 (2011.01)

(52) U.S. Cl.
CPC ................ *G09G 3/3241* (2013.01); *G09G 3/32* (2013.01); *G09G 3/3208* (2013.01);
(Continued)

(58) Field of Classification Search
CPC . G09G 3/3241; G09G 3/3208; G09G 3/3291; G09G 3/3266; H04N 5/3696
See application file for complete search history.

(56) References Cited

U.S. PATENT DOCUMENTS

2002/0047839 A1 4/2002 Kasai
2002/0050962 A1 5/2002 Kasai
(Continued)

FOREIGN PATENT DOCUMENTS

| CN | 1779767 A | 5/2006 |
| CN | 101075410 A | 11/2007 |
| CN | 102456315 A | 5/2012 |
| CN | 102479485 A | 5/2012 |

(Continued)

OTHER PUBLICATIONS

Chinese Office Action and Search Report regarding Application No. 2013102565026 dated Oct. 31, 2014. Translation provided by Dragon Intellectual Property Law Firm.
International Search Report and Written Opinion mailed Mar. 27, 2014 regarding PCT/CN2013/080788.
(Continued)

*Primary Examiner* — Shaheda Abdin
(74) *Attorney, Agent, or Firm* — Harness, Dickey & Pierce, P.L.C.

(57) ABSTRACT

Disclosed are a pixel circuit, a method for driving a pixel circuit, and a display panel, display apparatus and electronic product comprising the pixel circuit. The pixel circuit comprises at least two electroluminescence elements, wherein: an electrode in a first polarity of each of the at least two electroluminescence elements is coupled to a corresponding current control terminal; and an electrode in a second polarity of each of the at least two electroluminescence elements is coupled to a drive unit that supplies a drive current for the at least two electroluminescence elements.

20 Claims, 5 Drawing Sheets (52) U.S. Cl.
CPC ........... *G09G 3/3266* (2013.01); *G09G 3/3291* (2013.01); *H04N 5/3696* (2013.01); *H04N 5/3745* (2013.01); *G09G 2300/0842* (2013.01); *G09G 2300/0866* (2013.01); *G09G 2310/0256* (2013.01); *G09G 2320/02* (2013.01); *G09G 2320/043* (2013.01)

(56) References Cited

U.S. PATENT DOCUMENTS

| | | | |
|---|---|---|---|
| 2007/0188422 A1* | 8/2007 | Anazai | G06F 1/32 345/76 |
| 2008/0074356 A1* | 3/2008 | Cok | G09G 3/3233 345/76 |
| 2008/0238328 A1* | 10/2008 | Shin | G09G 3/2022 315/169.3 |

FOREIGN PATENT DOCUMENTS

| | | |
|---|---|---|
| CN | 103000131 A | 3/2013 |
| CN | 103000132 A | 3/2013 |
| CN | 203444736 U | 2/2014 |
| JP | 2009092964 A | 4/2009 |
| JP | 2012128172 A | 7/2012 |

OTHER PUBLICATIONS

Chinese Office Action mailed Mar. 20, 2015 regarding Chinese Application No. 201310256502.6 Translation provided by Dragon Intellectual Property Law Firm.

Written Opinion of the International Searching Authority for international application No. PCT/CN2013/080788. English translation provided by Dragon Intellectual Property Law Firm.

* cited by examiner

PIXEL CIRCUIT, METHOD FOR DRIVING PIXEL CIRCUIT, AND DISPLAY PANEL

CROSS-REFERENCE TO RELATED APPLICATIONS

This application is a U. S. National Stage of International No. PCT/CN2013/080788, filed on Aug. 5, 2013. This application claims the benefit of Chinese Patent Application No. 201310256502.6, filed on Jun. 25, 2013. The disclosures of the above applications are incorporated herein by reference.

BACKGROUND OF THE INVENTION

1. Field of the Invention

The present disclosure relates to the field of organic light-emitting and display technologies, and in particular, relates to a pixel circuit, a method for driving the pixel circuit, and a display panel, display apparatus and electronic product comprising the pixel circuit.

2. Description of the Prior Art

Compared with a traditional liquid crystal panel, an active matrix organic light-emitting diode (AMOLED) panel features higher response speed, higher contrast, and broader view-angle, and therefore the AMOLED is highly prevailed among developers specialized in display technologies.

Figure 1:
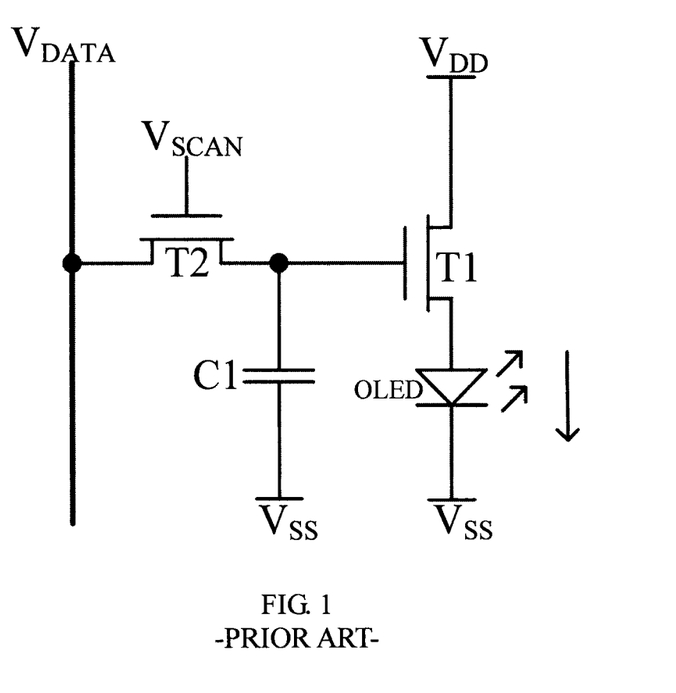
FIG. 1 is a schematic structural view of a pixel circuit with an N-channel type thin-film transistor in the prior art.
Figure 2:
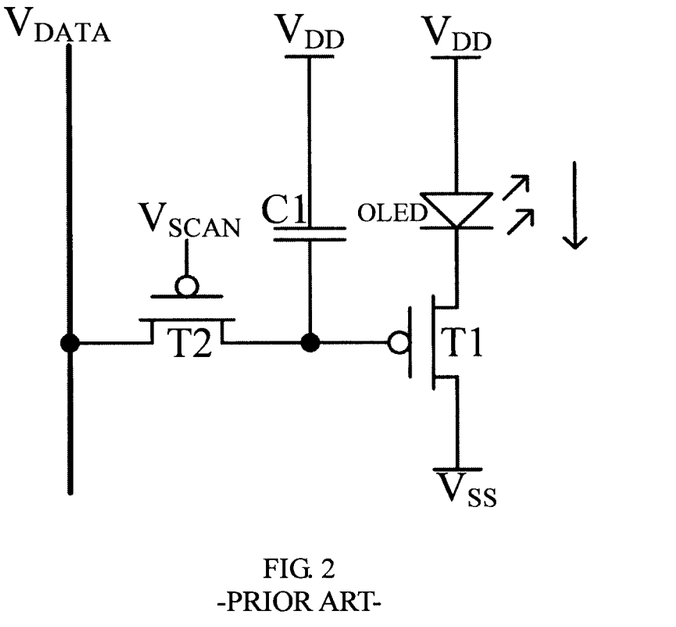
FIG. 2 is a schematic structural view of a pixel circuit with a P-channel type thin-film transistor in the prior art.

The AMOLED emits light under driving of a pixel circuit. In the prior art, the pixel circuit is substantially formed by two thin-film transistors (TFTs) and a capacitor, as illustrated in FIG. 1 and FIG. 2, comprising a drive transistor T1, a switch transistor T2, and a storage capacitor C1. ON and OFF of the switch transistor T1 is controlled by a scan signal voltage $V_{SCAN}$, so as to control input of a data voltage $V_{DATA}$. The drive transistor T1 is configured to supply a drive current for an organic light-emitting diode (OLED). The storage capacitor C1 is configured to supply a sustaining voltage for a gate electrode of the drive transistor T1. FIG. 1 illustrates a pixel circuit of an N-channel type drive transistor; and FIG. 2 illustrates a pixel circuit of a P-channel type drive transistor.

Within an image display period of each frame, since the pixel circuit has only one organic light-emitting diode, the organic light-emitting diode constantly stays in a light-emitting and display state within the image display period. In this way, the organic light-emitting diode is constantly in a direct current bias light-emitting state; and polarization of an organic material is quickened. Consequently, a built-in electric field (an electric field formed in a semiconductor or an insulator due to an internal action) of the organic light-emitting diode is rapidly strengthened, thereby causing a threshold voltage of the organic light-emitting diode to rise, and greatly deteriorating light-emitting efficiency of the organic light-emitting diode. Finally, service life of the organic light-emitting diode is greatly shortened.

SUMMARY OF THE INVENTION

I. Technical Problem to be Solved

The present disclosure is directed to providing a pixel circuit capable of improving service life of an organic light-emitting diode and meanwhile improving light-emitting efficiency of the organic light-emitting diode. The present disclosure further provides a method for driving the pixel circuit, a display panel, display apparatus and electronic product comprising the pixel circuit, to prolong service life of such apparatuses.

II. Technical Solutions

The present disclosure employs the following technical solutions:

A pixel circuit is provided, comprising at least two electroluminescence elements, wherein: an electrode in a first polarity of each of the at least two electroluminescence elements is coupled to a corresponding current control terminal; the current control terminals coupled to the electrodes in the first polarity of the at least two electroluminescence elements are different from each other; and an electrode in a second polarity of each of the at least two electroluminescence elements is coupled to a drive unit that supplies a drive current for the at least two electroluminescence elements.

Preferably, the drive unit comprises a switch element, an energy storage element, and a drive element; wherein: a first terminal of the switch element is coupled to a data line; and a second terminal of the switch element is coupled to a first terminal of the energy storage element; a first input terminal of the drive element is coupled to a first terminal of a drive power source; a second input terminal of the drive element is coupled to the a second terminal of the switch element and the first terminal of the energy storage element respectively; and an output terminal of the drive element is coupled to the electrodes in the second polarity of the at least two electroluminescence elements; and a second terminal of the energy storage element is coupled to a second terminal of the drive power source.

Preferably, two electroluminescence elements are employed.

Preferably, the electroluminescence elements comprise a first organic light-emitting diode and a second organic light-emitting diode; and the switch element is a switch transistor; the energy storage element is a storage capacitor; and the drive element is a drive transistor; wherein:

a gate electrode of the switch transistor is coupled to a scan signal line; a source electrode of the switch transistor is coupled to the data line; and a drain electrode of the switch transistor is coupled to a first terminal of the storage capacitor;

a gate electrode of the drive transistor is coupled to the drain electrode of the switch transistor and the first terminal of the storage capacitor respectively; a source electrode of the drive transistor is coupled to the first terminal of the drive power source; and a drain electrode of the drive transistor is coupled to electrodes in a second polarity of the first organic light-emitting diode and the second organic light-emitting diode respectively;

a second terminal of the storage capacitor is coupled to the second terminal of the drive power source; and a first terminal of the first organic light-emitting diode is coupled to a first current control terminal, and a first terminal of the second organic light-emitting diode is coupled to a second current control terminal.

Preferably, the drive transistor is an N-channel type thin-film transistor; the source electrode of the drive transistor is coupled to a high-level output terminal of the drive power source; and the drain electrode of the drive transistor is coupled to anodes of the first organic light-emitting diode and the second organic light-emitting diode respectively; and the second terminal of the storage capacitor is coupled to a low-level output terminal of the drive power source.

Preferably, the drive transistor is a P-channel type thin-film transistor; the source electrode of the drive transistor is coupled to a low-level output terminal of the drive power source; and the drain electrode of the drive transistor is coupled to cathodes of the first organic light-emitting diode and the second organic light-emitting diode respectively; and the second terminal of the storage capacitor is coupled to a high-level output terminal of the drive power source.

Preferably, the pixel circuit is a complementary metal-oxide semiconductor circuit.

The present disclosure further provides a driving method for driving the above pixel circuit.

Provided is a method for driving a pixel circuit, a working period of each frame comprising a charging period and a drive display period; wherein: within the working period of each frame, only one current control terminal controls an electroluminescence element coupled thereto to emit light; and other current control terminals control electroluminescence elements coupled thereto not to emit light; and within working periods of any two adjacent frames, electroluminescence elements emitting light are different.

Preferably, two electroluminescence elements are employed; the two electroluminescence elements are a first organic light-emitting diode and a second organic light-emitting diode; different current control terminals are a first current control terminal and a second current control terminal; and the switch element is a switch transistor.

Within each of the charging periods, the following operations are performed:

applying a scan signal on a scan signal line to turn on the switch transistor; and writing a data voltage on a data line into the storage capacitor; controlling, by the first current control terminal, the first organic light-emitting diode to experience a reverse bias; and controlling, by the second current control terminal, the second organic light-emitting diode to experience the reverse bias.

Preferably, two electroluminescence elements are employed; the two electroluminescence elements are a first organic light-emitting diode and a second organic light-emitting diode; different current control terminals are a first current control terminal and a second current control terminal, the switch element is a switch transistor; and the energy storage element is a storage capacitor.

Within a charging period, the following operations are performed:

applying a scan signal on a scan signal line to turn on the switch transistor; and writing a data voltage on a data line into a storage capacitor; controlling, by the first current control terminal, the first organic light-emitting diode to emit light; and controlling, by the second current control terminal, the second organic light-emitting diode to experience a reverse bias.

Within another charging period adjacent to the charging period, the following operations are performed:

applying a scan signal on a scan signal line to turn on the switch transistor; and writing a data voltage on a data line into the storage capacitor; controlling, by the second current control terminal, the second organic light-emitting diode to emit light; and controlling, by the first current control terminal, the first organic light-emitting diode to experience the reverse bias.

Preferably, two electroluminescence elements are employed; the two electroluminescence elements are a first organic light-emitting diode and a second organic light-emitting diode; different current control terminals are a first current control terminal and a second current control terminal; the switch element is a switch transistor; and the energy storage element is a storage capacitor.

Within a drive display period, the following operations are performed:

applying a scan signal on a scan signal line to turn off the switch transistor; controlling, by the first current control terminal, the first organic light-emitting diode to emit light under driving of a data voltage stored in the storage capacitor; and controlling, by the second current control terminal, the second organic light-emitting diode to experience a reverse bias;

Within another drive display period adjacent to the drive display period, the following operations are performed:

applying a scan signal on a scan signal line to turn off the switch transistor; controlling, by the second current control terminal, the second organic light-emitting diode to emit light under driving of the data voltage stored in the storage capacitor; and controlling, by the first current control terminal, the first organic light-emitting diode to experience the reverse bias.

The present disclosure further provides a display panel comprising any one of the above-described pixel circuits.

The present disclosure further provides a display apparatus comprising the above-described display panel.

The present disclosure further provides an electronic product comprising the above-described display apparatus.

III. Beneficial Effects

In the pixel circuit according to the present disclosure, at least two independently controlled organic light-emitting diodes are arranged to control the organic light-emitting diodes to stay alternately in a light-emitting and display state, thereby preventing a single organic light-emitting diode from constantly staying in a direct current bias light-emitting state, and retarding polarization of an organic material. In this way, a threshold voltage of the organic light-emitting diode is stable; light-emitting efficiency of the organic light-emitting diode is improved; and service life of the organic light-emitting diode is greatly prolonged.

DETAILED DESCRIPTION OF THE PREFERRED EMBODIMENTS

The present disclosure is further described with reference to the drawings and exemplary embodiments. The following embodiments are merely for illustrating the present disclosure, rather than limiting the scope of the present disclosure.

Among the pixel circuits according to the present disclosure, each pixel circuit is coupled to a scan signal line and a data line, and comprises at least two electroluminescence elements. An electrode in a first polarity of each of the at least two electroluminescence elements is coupled to a corresponding current control terminal; and an electrode in a second polarity of each of the at least two electroluminescence elements is coupled to a drive unit that supplies a drive current for the at least two electroluminescence elements. The electroluminescence elements are controlled to stay alternately in a light-emitting and display state, thereby preventing a single electroluminescence element from constantly staying in a direct current bias light-emitting state, and prolonging service life of the electroluminescence elements. For convenient control and for no increase of complexity of the pixel circuit, in this embodiment two electroluminescence elements are employed. Further description is given as follows by using an organic light-emitting diode that is widely applied in the AMOLED as an example.

Figure 3:
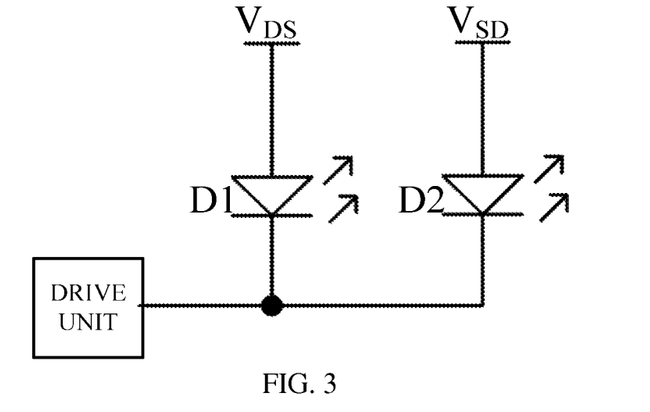
FIG. 3 is a schematic structural view of a pixel circuit according to an embodiment of the present disclosure.
Figure 4:
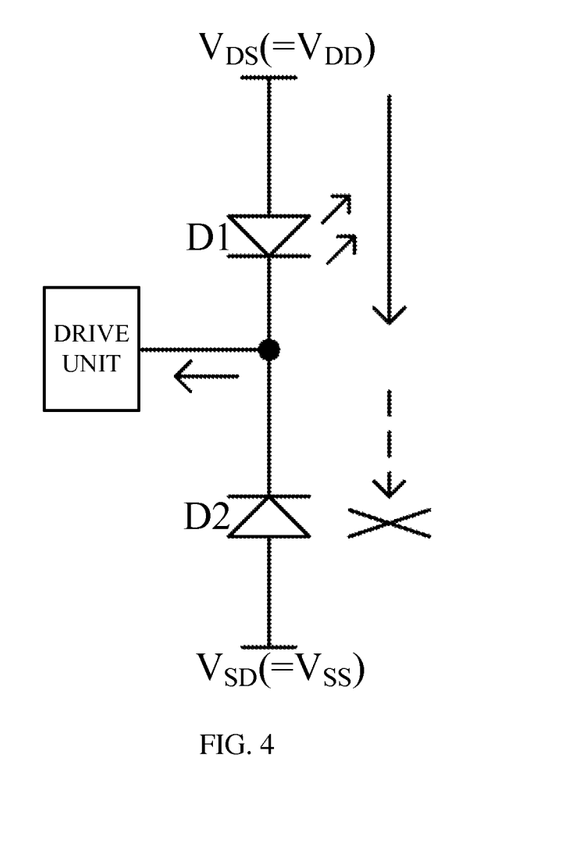
FIG. 4 is a schematic view of an equivalent circuit in a working state of the pixel circuit illustrated in FIG. 3.
Figure 5:
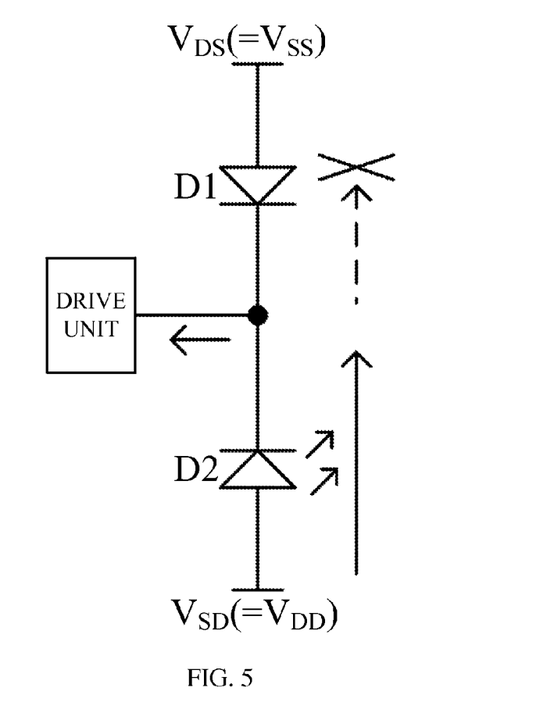
FIG. 5 is a schematic view of another equivalent circuit in a working state of the pixel circuit illustrated in FIG. 3.

The pixel circuit as illustrated in FIG. 3 comprises a first organic light-emitting diode D1 and a second organic light-emitting diode D2 whose electrodes in a second polarity are respectively coupled to a control unit. A first terminal of the first organic light-emitting diode D1 is coupled to a first current control terminal $V_{DS}$; and a first terminal of the second organic light-emitting diode D2 is coupled to a second current control terminal $V_{SD}$, such that the first current control terminal $V_{DS}$ and the second current control terminal $V_{SD}$ supply currents in two opposite directions. The two organic light-emitting diodes are controlled, by using a pair of currents in opposite directions, to alternately emit light and implement display, thereby reducing half of the light-emitting period of each of the organic light-emitting diodes, and enabling the organic light-emitting diode to experience a reverse bias in the case of emitting no light. A specific example is as illustrated in FIG. 4 and FIG. 5. In FIG. 4, the first current control terminal $V_{DS}$ is in a high level $V_{DD}$; and the first organic light-emitting diode D1 emits light and implements display under control of a current flowing from the first current control terminal $V_{DS}$ to the drive unit. And the second current control terminal $V_{SD}$ is a low level $V_{SS}$; and the second organic light-emitting diode D2 experiences a reverse bias, thereby mitigating polarization of ions therein and prolonging service life thereof. In FIG. 5, the second current control terminal $V_{SD}$ is in a high level $V_{DD}$; and the second organic light-emitting diode D2 emits light and implements display under control of a current flowing from the second current control terminal $V_{SD}$ to the drive unit; and the first current control terminal $V_{DS}$ is a low level $V_{SS}$; and the first organic light-emitting diode D1 experiences a reverse bias, thereby mitigating polarization of ions therein and prolonging service life thereof.

Figure 6:
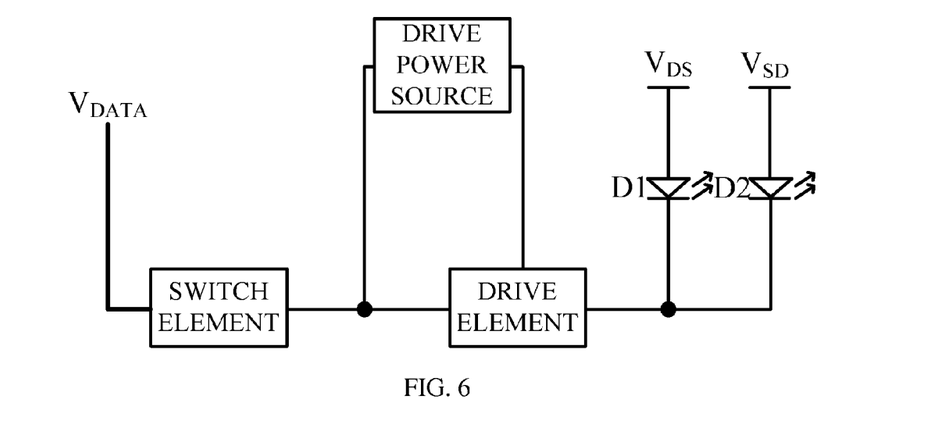
FIG. 6 is a schematic structural view of another pixel circuit according to an embodiment of the present disclosure.

As illustrated in FIG. 6, the drive unit in this embodiment comprises a switch element, an energy storage element, and a drive element. The switch element is configured to control writing of a data voltage on a data line, wherein a first terminal of the switch element is coupled to the data line; and a second terminal of the switch element is coupled to a first terminal of the energy storage element. The drive element is configured to supply a drive current for an organic light-emitting element, wherein a first input terminal of the drive element is coupled to a first terminal of a drive power source; a second input terminal of the drive element is coupled to the second terminal of the switch element and the first terminal of the energy storage element respectively; and an output terminal of the drive element is coupled to electrodes in a second polarity of the organic light-emitting diodes. The energy storage element is configured to store a data voltage, wherein a second terminal of the energy storage element is coupled to a second terminal of the drive power source.

Figure 7:
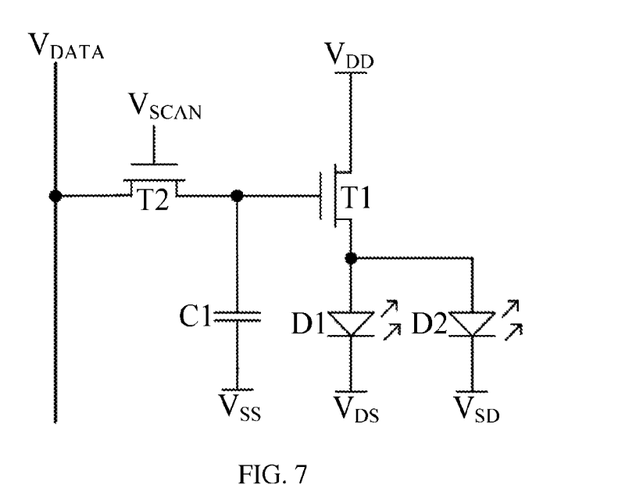
FIG. 7 is a schematic view of implementation circuit of an N-channel type thin film transistor of the pixel circuit illustrated in FIG. 6.

A specific implementation of the pixel circuit illustrated in FIG. 6 is illustrated in FIG. 7, wherein the switch element is a switch transistor T2; the energy storage element is a storage capacitor C1; the drive element is a drive transistor T1; and the switch transistor T2 and the drive transistor T1 are both N-channel type thin-film transistors. The scan signal line provides a scan signal to turn on or turn off the switch transistor T2; and the data line writes a data voltage signal into the pixel circuit by using the switch transistor T2. A gate electrode of the switch transistor T2 is coupled to the scan signal line; a source electrode of the switch transistor T2 is coupled to the data line; and a drain electrode of the switch transistor T2 is coupled to a first terminal of the storage capacitor C1. Under control of the scan signal provided by the scan signal line, the switch transistor T2 provides the data voltage signal of the data line to the storage capacitor C1; and the storage capacitor C1 maintains the voltage. A gate electrode of the drive transistor T1 is coupled to the drain electrode of the switch transistor T2 and the first terminal of the storage capacitor C1 respectively; a source electrode of the drive transistor T1 is coupled to a high-level output terminal of the drive power source; and a drain electrode of the drive transistor T1 is coupled to anodes of the first organic light-emitting diode D1 and the second organic light-emitting diode D2 respectively. A second terminal of the storage capacitor C1 is coupled to a low-level output terminal of the drive power source. The drive transistor T1 is ON or OFF under control of the data voltage provided by the data line and a storage voltage of the storage capacitor C1. A cathode of the first organic light-emitting diode D1 is coupled to the first current control terminal $V_{DS}$; and a cathode of the second organic light-emitting diode D2 is coupled to the second current control terminal $V_{SD}$.

Figure 8:
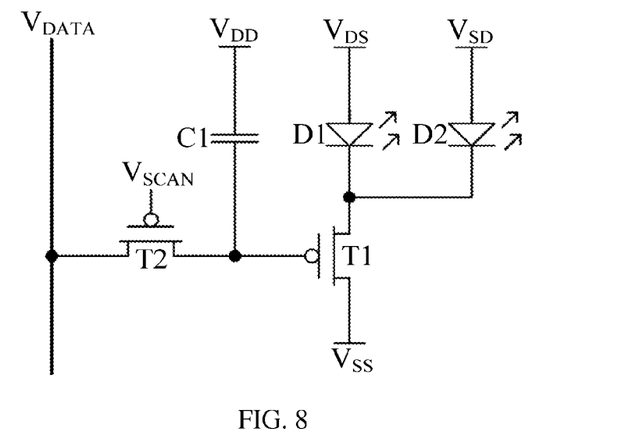
FIG. 8 is a schematic view of implementation circuit of a P-channel type thin film transistor of the pixel circuit illustrated in FIG. 6.

A person skilled in the art may readily contemplate that the pixel circuit according to the present disclosure may be simply modified into a P-channel type thin-film transistor circuit, as illustrated in FIG. 8. The connection structure of the P-channel type thin-film transistor circuit differs from the connection structure of the N-channel type thin-film transistor in that, the source electrode of the drive transistor T1 is coupled to the low-level output terminal of the drive power source; the drain electrode of the drive transistor T1 is coupled to the cathodes of the first organic light-emitting diode D1 and the second organic light-emitting diode D2; and the second terminal of the storage capacitor C1 is coupled to the high-level output terminal of the drive power source. Nevertheless, the pixel circuit according to the present disclosure may be simply modified into a complementary metal-oxide semiconductor (CMOS) circuit, and is not limited to the pixel circuit in this embodiment. The details are not given herein any further.

Figure 9:
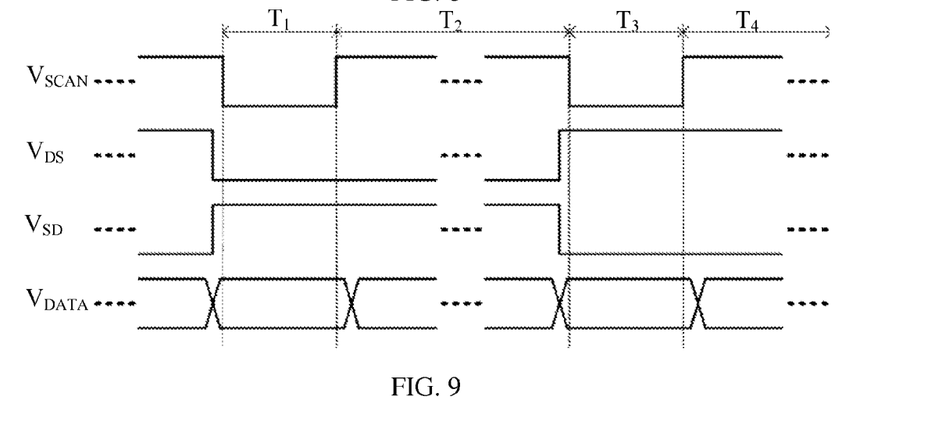
FIG. 9 is a view of drive periods of the pixel circuit illustrated in FIG. 7.

The present disclosure further provides a method for driving the above-described pixel circuit, in which a working period of each frame comprises a charging period and a drive display period. Within the working period of each frame, only one current control terminal controls an electroluminescence element coupled thereto to emit light; and other current control terminals control electroluminescence elements coupled thereto not to emit light. In addition, within working periods of any two adjacent frames, electroluminescence elements emitting light are different. In this way, different electroluminescence elements are enabled to stay alternately in a light-emitting and display state, thereby preventing an electroluminescence element from constantly staying in a direct current bias light-emitting state, and prolonging service life of the electroluminescence elements. Description is given as follows by using a method for driving the pixel circuit illustrated in FIG. 7 as an example. A schematic view of drive periods is illustrated in FIG. 9, which illustrates changes of a scan $V_{SCAN}$ signal voltage on a scan signal line, a data voltage $V_{DATA}$ on a data line, and currents at the first current control terminal $V_{DS}$ and the second current control terminal $V_{SD}$, within working periods of any two adjacent frames.

A First Charging Period T1

Within this period, the following operations are performed: A high-level scan signal voltage is applied on the scan signal line to turn on the switch transistor T2; and a data voltage on the data line is written into the storage capacitor C1. The first current control terminal $V_{DS}$ is in a low level $V_{SS}$; and controls the first organic light-emitting diode D1 to emit light. And the second current control terminal $V_{SD}$ is in a high level $V_{DD}$ and controls the second organic light-emitting diode D2 to experience a reverse bias. However, since within the charging period, the data voltage needs to be written into the storage capacitor, the voltage supplied to the gate electrode of the drive transistor T1 may be unstable, thereby affecting light-emitting stability of the organic light-emitting diode. Therefore, in this embodiment, within the charging period, the first current control terminal may control the first organic light-emitting diode to experience a reverse bias, while the second current control terminal may control the second organic light-emitting diode to experience a reverse bias, thereby preventing light-emitting instability.

A First Drive Display Period T2

Figure 10:
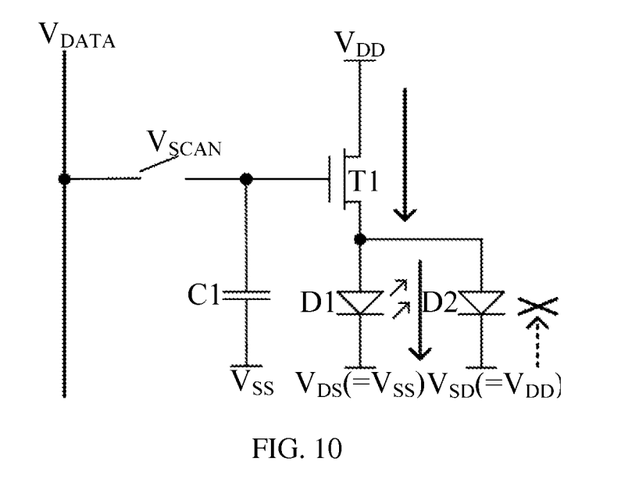
FIG. 10 is a schematic view of an equivalent circuit within a period T2 of the pixel circuit illustrated in FIG. 7.

An equivalent circuit within this period is illustrated in FIG. 10. And within this period, the following operations are performed: A low-level signal scan signal voltage is applied on the scan signal line to turn off the switch transistor T2; the first current control terminal $V_{DS}$ is in a low level $V_{SS}$ and controls the first organic light-emitting diode D1 to emit light under driving of a data voltage stored in the storage capacitor C1. And the second current control terminal $V_{SD}$ is in a high level $V_{DD}$ and controls the second organic light-emitting diode D2 to experience a reverse bias.

A Second Charging Period T3

Within this period, the following operations are performed. A high-level scan signal voltage is applied on the scan signal line to turn on the switch transistor T2; and a data voltage on the data line is written into the storage capacitor C1. The second current control terminal $V_{SD}$ is in a low level $V_{SS}$ and controls the second organic light-emitting diode D2 to emit light. And the first current control terminal $V_{DS}$ is in a high level $V_{DD}$ and controls the first organic light-emitting diode D1 to experience a reverse bias. However, since within the charging period, the data voltage needs to be written into the storage capacitor, the voltage supplied to the gate electrode of the drive transistor T1 may be unstable, thereby affecting light-emitting stability of the organic light-emitting diode. Therefore, in this embodiment, within the charging period, the first current control terminal may control the first organic light-emitting diode to experience a reverse bias, while the second current control terminal may control the second organic light-emitting diode to experience a reverse bias, thereby preventing light-emitting instability.

A Second Drive Display Period T4

Figure 11:
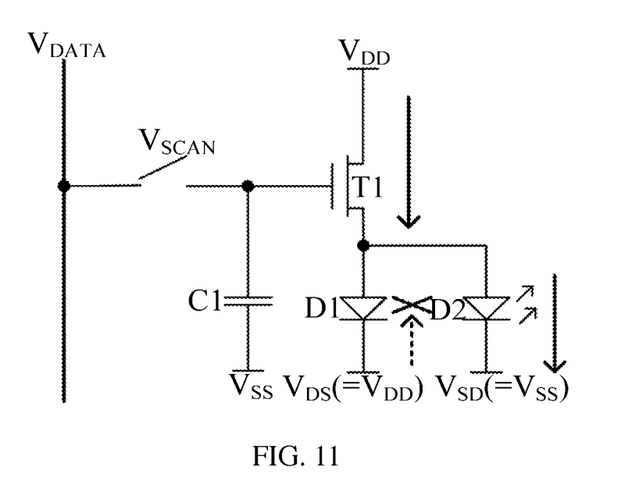
FIG. 11 is a schematic view of an equivalent circuit within a period T4 of the pixel circuit illustrated in FIG. 7.

An equivalent circuit within this period is illustrated in FIG. 11. And within this period, the following operations are performed: A low-level signal scan signal voltage is applied on the scan signal line to turn off the switch transistor T2. The second current control terminal $V_{SD}$ is in a low level $V_{SS}$ and controls the second organic light-emitting diode D2 to emit light under driving of the data voltage stored in the storage capacitor C1. And the first current control terminal $V_{DS}$ is in a high level $V_{DD}$ and controls the first organic light-emitting diode D1 to experience a reverse bias.

In the method for driving a pixel circuit according to this embodiment, within working periods of any two adjacent frames, two organic light-emitting diodes alternately emit light and implement display, thereby preventing a single organic light-emitting diode from constantly staying in a direct current bias light-emitting state, and retarding polarization of an organic material. In this way, a threshold voltage of the organic light-emitting diode is stable; light-emitting efficiency of the organic light-emitting diode is improved; and service life of the organic light-emitting diode is greatly prolonged.

The present disclosure further provides a display panel comprising any one of the above-described pixel circuits, a display apparatus comprising the display panel, and an electronic product comprising the display apparatus. The employed pixel circuit has a relatively longer service life. Therefore, service life the display apparatus is accordingly prolonged; and quality thereof is more reliable.

The embodiments described above are merely for illustrating the present disclosure, and are not intended to limit the present disclosure. Persons of ordinary skill in the art may derive various changes and variations without departing from the spirit and scope of the present disclosure. Such equivalent technical solutions shall pertain to the protection scope of the present disclosure.

What is claimed is:

1. A pixel circuit, comprising at least two electroluminescence elements, wherein: an electrode in a first polarity of each of the at least two electroluminescence elements is coupled to a corresponding current control terminal; the current control terminals coupled to the electrodes in the first polarity of the at least two electroluminescence elements are different from each other; a direction of current supplied by one of the current control terminals is opposite to that supplied by the rest of the current control terminals and said one of the current control terminals is alternately selected among the current control terminals; and an electrode in a second polarity of each of the at least two electroluminescence elements is directly coupled to a same node which is coupled to a drive unit that supplies a drive current for the at least two electroluminescence elements.

2. The pixel circuit according to claim 1, wherein the drive unit comprises a switch element, an energy storage element, and a drive element; wherein: a first terminal of the switch element is coupled to a data line; and a second terminal of the switch element is coupled to a first terminal of the energy storage element; a first input terminal of the drive element is coupled to a first terminal of a drive power source; a second input terminal of the drive element is coupled to the a second terminal of the switch element and the first terminal of the energy storage element respectively; and an output terminal of the drive element is coupled to the electrodes in the second polarity of the at least two electroluminescence elements; and a second terminal of the energy storage element is coupled to a second terminal of the drive power source.

3. The pixel circuit according to claim 2, wherein two electroluminescence elements are employed.

4. The pixel circuit according to claim 1, wherein two electroluminescence elements are employed.

5. The pixel circuit according to claim 4, wherein the two electroluminescence elements are a first organic light-emitting diode and a second organic light-emitting diode; the switch element is a switch transistor; the energy storage element is a storage capacitor; and the drive element is a drive transistor; wherein:

a gate electrode of the switch transistor is coupled to a scan signal line; a source electrode of the switch transistor is coupled to the data line; and a drain electrode of the switch transistor is coupled to a first terminal of the storage capacitor;

a gate electrode of the drive transistor is coupled to the drain electrode of the switch transistor and the first terminal of the storage capacitor respectively; a source electrode of the drive transistor is coupled to the first terminal of the drive power source; and a drain electrode of the drive transistor is coupled to electrodes in a second polarity of the first organic light-emitting diode and the second organic light-emitting diode respectively;

a second terminal of the storage capacitor is coupled to the second terminal of the drive power source; and an electrode in a first polarity of the first organic light-emitting diode is coupled to a first current control terminal; and an electrode in a first polarity of the second organic light-emitting diode is coupled to a second current control terminal.

6. The pixel circuit according to claim 5, wherein: the drive transistor is an N-channel type thin-film transistor; the source electrode of the drive transistor is coupled to a high-level output terminal of the drive power source; and the drain electrode of the drive transistor is coupled to anodes of the first organic light-emitting diode and the second organic light-emitting diode respectively; and the second terminal of the storage capacitor is coupled to a low-level output terminal of the drive power source.

7. The pixel circuit according to claim 5, wherein: the drive transistor is a P-channel type thin-film transistor; the source electrode of the drive transistor is coupled to a low-level output terminal of the drive power source; and the drain electrode of the drive transistor is coupled to cathodes of the first organic light-emitting diode and the second organic light-emitting diode respectively; and the second terminal of the storage capacitor is coupled to a high-level output terminal of the drive power source.

8. The pixel circuit according to claim 1, wherein the pixel circuit is a complementary metal-oxide semiconductor circuit.

9. A method for driving a pixel circuit, the pixel circuit comprising at least two electroluminescence elements, wherein an electrode in a first polarity of each of the at least two electroluminescence elements is coupled to a corresponding current control terminal; the current control terminals coupled to the electrodes in the first polarity of the at least two electroluminescence elements are different from each other; a direction of current supplied by one of the current control terminals is opposite to that supplied by the rest of the current control terminals and said one of the current control terminals is alternately selected among the current control terminals; and an electrode in a second polarity of each of the at least two electroluminescence elements is directly coupled to a same node which is coupled to a drive unit that supplies a drive current for the at least two electroluminescence elements;

wherein a working period of each frame comprises a charging period and a drive display period;

within the working period of each frame, only one current control terminal controls an electroluminescence element coupled thereto to emit light; and other current control terminals control electroluminescence elements coupled thereto not to emit light; and within working periods of any two adjacent frames, electroluminescence elements emitting light are different.

10. The method according to claim 9, wherein:

two electroluminescence elements are employed; the two electroluminescence elements are a first organic light-emitting diode and a second organic light-emitting diode; different current control terminals are a first current control terminal and a second current control terminal; and the switch element is a switch transistor;

within each of the charging periods, the following operations are performed:

applying a scan signal on a scan signal line to turn on the switch transistor; and writing a data voltage on the data line into the storage capacitor; controlling, by the first current control terminal, the first organic light-emitting diode to experience a reverse bias; and controlling, by the second current control terminal, the second organic light-emitting diode to experience the reverse bias.

11. The method according to claim 9, wherein:

two electroluminescence elements are employed; the two electroluminescence elements are a first organic light-emitting diode and a second organic light-emitting diode; different current control terminals are a first current control terminal and a second current control terminal; the switch element is a switch transistor; and the energy storage element is a storage capacitor;

within a charging period, the following operations are performed:

applying a scan signal on the scan signal line to turn on the switch transistor; and writing a data voltage on the data line into a storage capacitor; controlling, by the first current control terminal, the first organic light-emitting diode to emit light; and controlling, by the second current control terminal, the second organic light-emitting diode to experience a reverse bias;

within another charging period adjacent to the charging period, the following operations are performed:

applying a scan signal on the scan signal line to turn on the switch transistor; and writing a data voltage on the data line into the storage capacitor; controlling, by the second current control terminal, the second organic light-emitting diode to emit light; and controlling, by the first current control terminal, the first organic light-emitting diode to experience the reverse bias.

12. The method according to claim 9, wherein:

two electroluminescence elements are employed; the two electroluminescence elements are a first organic light-emitting diode and a second organic light-emitting diode; different current control terminals are a first current control terminal and a second current control terminal; the switch element is a switch transistor; and the energy storage element is a storage capacitor;

within a drive display period, the following operations are performed:

applying a scan signal on the scan signal line to turn off the switch transistor; controlling, by the first current control terminal, the first organic light-emitting diode to emit light under driving of a data voltage stored in the storage capacitor; and controlling, by the second current control terminal, the second organic light-emitting diode to experience a reverse bias;

within another drive display period adjacent to the drive display period, performing the following operations:

applying a scan signal on the scan signal line to turn off the switch transistor; controlling, by the second current control terminal, the second organic light-emitting diode to emit light under driving of the data voltage stored in the storage capacitor; and controlling, by the first current control terminal, the first organic light-emitting diode to experience the reverse bias.

13. The method according to claim 9, wherein the drive unit comprises a switch element, an energy storage element, and a drive element; wherein: a first terminal of the switch element is coupled to the data line; and a second terminal of the switch element is coupled to a first terminal of the energy storage element; a first input terminal of the drive element is coupled to a first terminal of a drive power source; a second input terminal of the drive element is coupled to the a second terminal of the switch element and the first terminal of the energy storage element respectively; and an output terminal of the drive element is coupled to the electrodes in the second polarity of the at least two electroluminescence elements; and a second terminal of the energy storage element is coupled to a second terminal of the drive power source.

14. A display panel, comprising a plurality of pixel circuits that are arranged in an array manner, wherein:
   an electrode in a first polarity of each of at least two electroluminescence elements is coupled to a corresponding current control terminal; the current control terminals coupled to the electrodes in the first polarity of the at least two electroluminescence elements are different from each other; a direction of current supplied by one of the current control terminals is opposite to that supplied by the rest of the current control terminals and said one of the current control terminals is alternately selected among the current control terminals; and
   an electrode in a second polarity of each of the at least two electroluminescence elements is directly coupled to a same node which is coupled to a drive unit that supplies a drive current for the at least two electroluminescence elements.

15. The display panel according to claim 14, wherein the drive unit comprises a switch element, an energy storage element, and a drive element; wherein: a first terminal of the switch element is coupled to the data line; and a second terminal of the switch element is coupled to a first terminal of the energy storage element; a first input terminal of the drive element is coupled to a first terminal of a drive power source; a second input terminal of the drive element is coupled to the a second terminal of the switch element and the first terminal of the energy storage element respectively; and an output terminal of the drive element is coupled to the electrodes in the second polarity of the at least two electroluminescence elements; and a second terminal of the energy storage element is coupled to a second terminal of the drive power source.

16. The display panel according to claim 15, wherein two electroluminescence elements are employed.

17. The display panel according to claim 16, wherein the two electroluminescence elements are a first organic light-emitting diode and a second organic light-emitting diode; the switch element is a switch transistor; the energy storage element is a storage capacitor; and the drive element is a drive transistor; wherein:
   a gate electrode of the switch transistor is coupled to a scan signal line; a source electrode of the switch transistor is coupled to the data line; and a drain electrode of the switch transistor is coupled to a first terminal of the storage capacitor;
   a gate electrode of the drive transistor is coupled to the drain electrode of the switch transistor and the first terminal of the storage capacitor respectively; a source electrode of the drive transistor is coupled to the first terminal of the drive power source; and a drain electrode of the drive transistor is coupled to electrodes in a second polarity of the first organic light-emitting diode and the second organic light-emitting diode respectively;
   a second terminal of the storage capacitor is coupled to the second terminal of the drive power source; and
   an electrode in a first polarity of the first organic light-emitting diode is coupled to a first current control terminal; and an electrode in a first polarity of the second organic light-emitting diode is coupled to a second current control terminal.

18. The display panel according to claim 17, wherein: the drive transistor is an N-channel type thin-film transistor; the source electrode of the drive transistor is coupled to a high-level output terminal of the drive power source; and the drain electrode of the drive transistor is coupled to anodes of the first organic light-emitting diode and the second organic light-emitting diode respectively; and the second terminal of the storage capacitor is coupled to a low-level output terminal of the drive power source.

19. The display panel according to claim 17, wherein: the drive transistor is a P-channel type thin-film transistor; the source electrode of the drive transistor is coupled to a low-level output terminal of the drive power source; and the drain electrode of the drive transistor is coupled to cathodes of the first organic light-emitting diode and the second organic light-emitting diode respectively; and the second terminal of the storage capacitor is coupled to a high-level output terminal of the drive power source.

20. The display panel according to claim 14, wherein two electroluminescence elements are employed.

* * * * *